Figure 5:
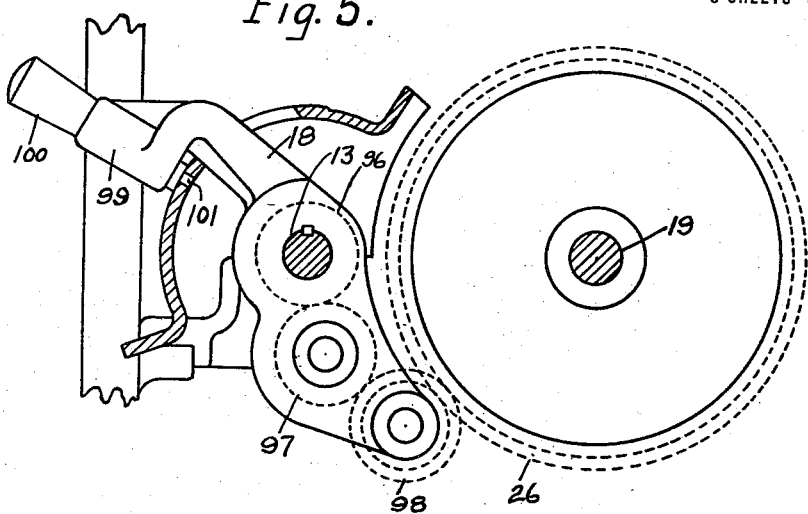
Figure 6:
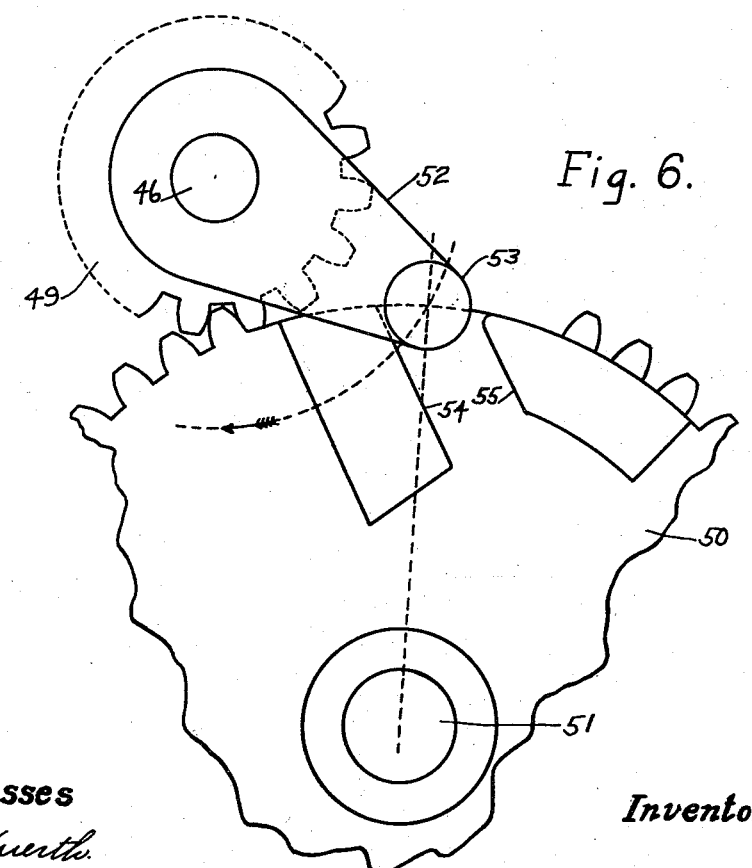

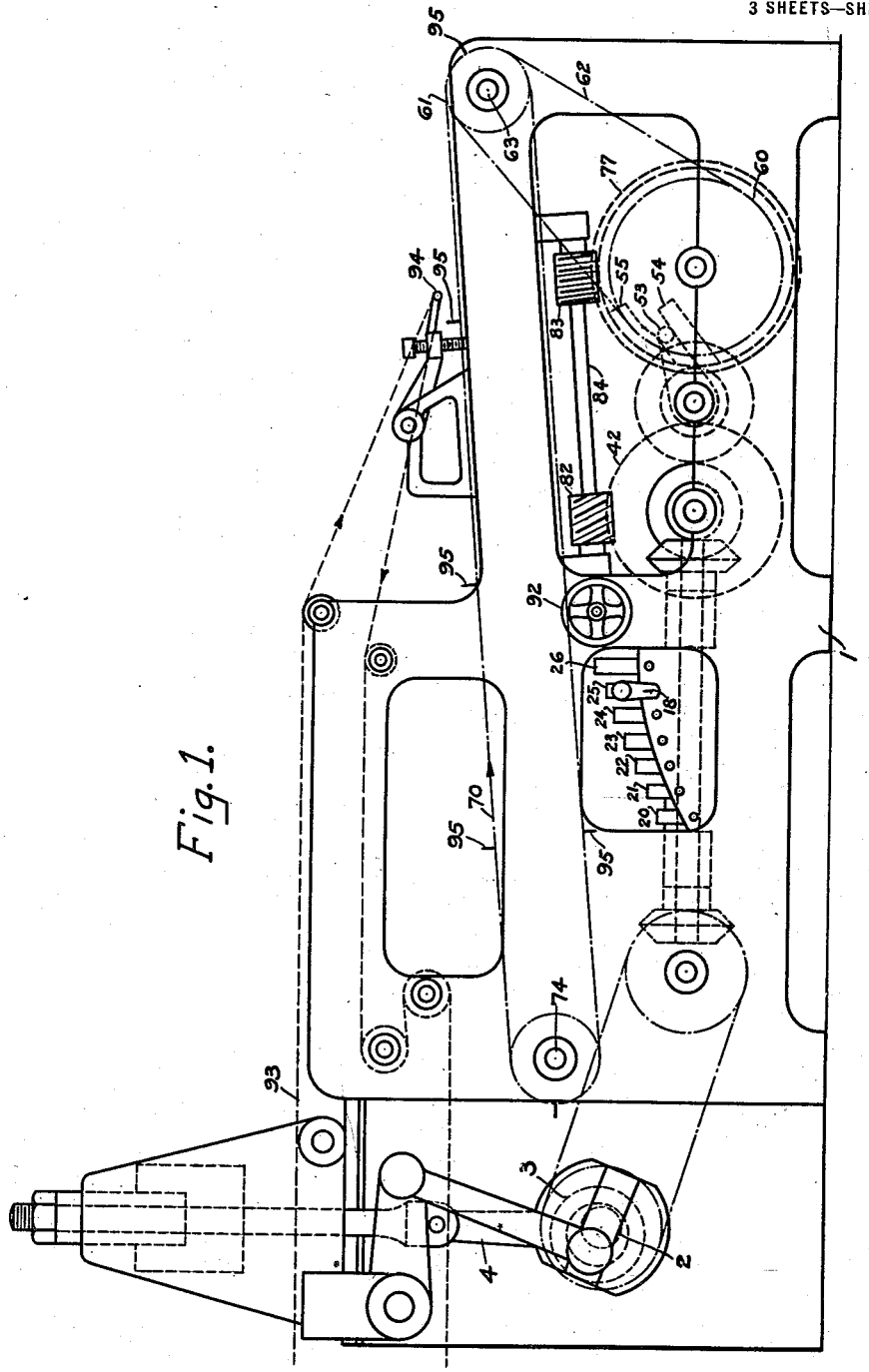

D. K. ALLISON.
PAN REGISTERING MECHANISM FOR CRACKER CUTTING MACHINES.
APPLICATION FILED NOV. 28, 1917.
1,277,678.
Patented Sept. 3, 1918.
3 SHEETS—SHEET 2.
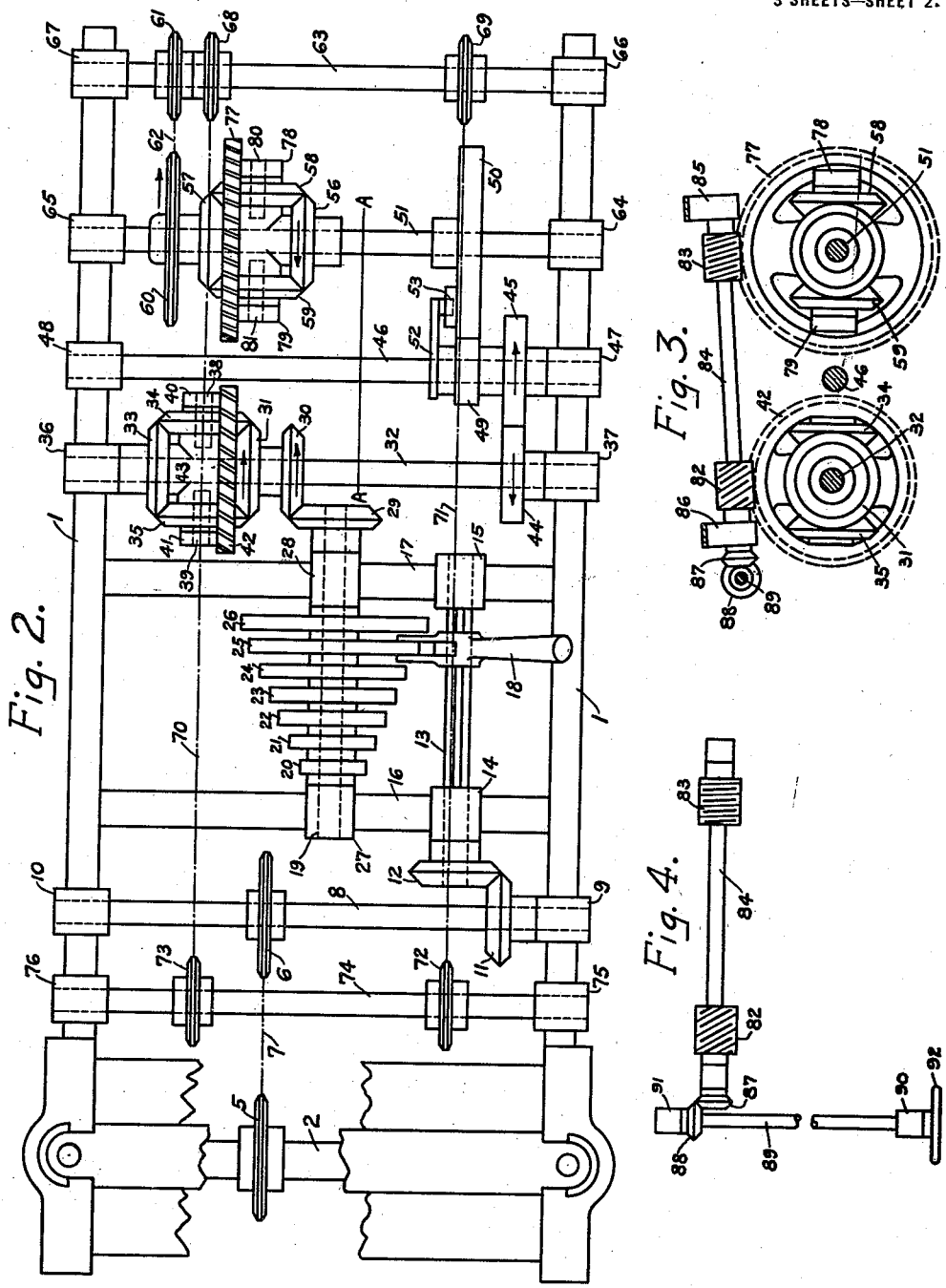
Witnesses.
E. A. Wuerth.
C. H. Dunn.
Inventor.
Daniel K. Allison D. K. ALLISON.
PAN REGISTERING MECHANISM FOR CRACKER CUTTING MACHINES.
APPLICATION FILED NOV. 28, 1917.

1,277,678.

Patented Sept. 3, 1918.
3 SHEETS—SHEET 3.

Witnesses
E. A. Wuerth.
C. H. Dunn.

Inventor
Daniel K. Allison

UNITED STATES PATENT OFFICE.

DANIEL K. ALLISON, OF CINCINNATI, OHIO, ASSIGNOR TO THE J. H. DAY COMPANY, OF CINCINNATI, OHIO, A CORPORATION OF OHIO.

PAN-REGISTERING MECHANISM FOR CRACKER-CUTTING MACHINE.

1,277,678.   Specification of Letters Patent.   Patented Sept. 3, 1918.

Application filed November 28, 1917. Serial No. 204,306.

*To all whom it may concern:*

Be it known that I, DANIEL K. ALLISON, residing at Cincinnati, in the county of Hamilton and State of Ohio, have invented a certain new and useful Improvement in Pan-Registering Mechanism for Cracker-Cutting Machines, of which the following is a specification.

My invention relates to that class of cracker cutting machines in which a vertically reciprocating cutter head provided with cutting dies operates upon a sheet of dough traveling beneath said cutter upon an endless apron, and cuts the same into cracker blanks or forms, and which, after being so cut, are deposited onto pans carried by an endless conveyer. In the patent to the said Daniel K. Allison and Bryan D. Pinkney for an improvement in cracker cutting machines, dated September 29, 1914, No. 1,112,184, means are shown and described for setting their endless conveyer relatively forward or backward while the same is in motion, for the purpose of registering the pans with the panskip. This is accomplished by accelerating or retarding their pan carrying chains to a velocity above or below normal. My invention herein has for its object the advancement or recession of the pan skipping mechanism by accelerating or retarding the pan skipping gears for the purpose of registering the panskip with the pans, without effecting any change in the velocity of my pan carrying chains.

In order to accomplish this object means are provided to supplement the action of the power drive gears which transmit motion to the pan skip mechanism and the endless conveyer by which hand power may be transmitted through the said power drive gears while they are in motion to bring about abnormal velocity of the pan skipping gears. I attain the object by the mechanism illustrated in the accompanying drawings, in which:—

Figure (1) is a side elevation of my machine; Fig. (2) is a plan view of the same; Fig. (3) is a partial longitudinal section through Fig. (2) along the line A—A; Fig. (4) is a plan view of shafts 84 and 89, showing their intermeshing miter gears 87 and 88, and the arrangement of worms 82 and 83. Fig. (5) is a section through shafts 19 and 13 showing the tumbler device in elevation. Fig. (6) is a partial view of gears 49 and 50 showing the pan skipping device.

The machine is mounted within the side frames 1—1. The crankshaft 2 is connected to any suitable cutter head by the eccentrics 3—3 and connecting rods 4—4. Securely keyed to the crankshaft 2 is the sprocket wheel 5 which drives sprocket wheel 6 by chain 7. Said sprocket wheel 6 is securely keyed to shaft 8 which is journaled in bearings 9 and 10. The bevel gear 11 is also keyed to shaft 8 and meshes in and drives bevel gear 12 which is securely keyed to longitudinal shaft 13. Said shaft 13 is journaled in bearings 14 and 15, located in the cross frames 16 and 17. The tumbler device 18 is slidably mounted on said shaft 13 and carries a train of small tumbler gears 96, 97 and 98, by means of which said shaft 13 may be made to drive shaft 19 through any one of the gears 20 to 26 inclusive. The gear 96 is splined to shaft 13, so that by moving the said tumbler device throughout the length of this shaft the gear 96 will be driven at any position thereon. The tumbler device 18 is provided with an arm 99. Slidably mounted in said arm 99 is a plunger 100. This plunger is provided at its extreme end with a locking pin 101. The tumbler device can be so moved as to mesh the gear 98 with any one of the gears 20 to 26 inclusive, and whatever gear it is meshing with the locking pin 101 will be inserted in a corresponding hole. Shaft 19 is rotatably mounted in bearings 27 and 28, which in turn are secured to said cross frames 16 and 17. Miter gear 29 is keyed to shaft 19 and drives gear 30 which is integral with miter gear 31. Gears 30 and 31 are loosely mounted on shaft 32, gear 31 being arranged to drive gear 33 through the idler miter gears 34 and 35. Gear 33 is keyed to shaft 32. Shaft 32 is rotatably mounted in bearings 36 and 37. Gears 34 and 35 are loosely mounted upon the short shafts 38 and 39. These short shafts are mounted in the lugs 40 and 41, which said lugs are integral with the wormwheel 42 extending from one side thereof. The inner ends of said short shafts are mounted within the hub 43 of said wormwheel 42. Gear 44 is keyed to shaft 32 and drives gear 45, keyed to shaft 46. Said shaft 46 is rotatably mounted in bearings 47 and 48 and has keyed to it gear 49. Gear 49 normally drives gear 50 which said gear is keyed to shaft 51. Shaft 51 is rotatably mounted in bearings 64 and 65. Gear 49 carries an arm 52 provided with a roller 53 at its extremity. On the side of gear 50 are mounted plates 54 and 55 which form a cam race in which said roller 53 operates. During its normal action the gear teeth of the two gears 49 and 50 will intermesh but part of the teeth of gear 50 are cut away as shown in Fig. (6). When the last tooth is engaging as shown in Fig. (6) the roller 53 is beginning to enter the cam race between the plates 54 and 55. Said roller 53 will now drive said gear 50 in the direction indicated by the arrow and in its course will approach nearer the center of gear 50. As the roller 53 approaches nearer to the center of the gear 50 said gear 50 will be driven at an accelerated velocity which velocity is increased until said roller 53 has reached the position nearest the center of gear 50, after which during further rotation of roller 53, the velocity of gear 50 will be gradually retarded until the roller 53 has passed out of the cam race and the teeth of gear 49 reëngage the teeth of gear 50. The arm 52, roller 53 and the plates 54 and 55 may be denominated a pan skip mechanism and its function is to accelerate the movement of the panning chains 70 at certain intervals to prevent crackers or biscuits from being deposited on the edges of the pans. Miter gear 56 is keyed to shaft 51 and drives miter gear 57 through idler gears 58 and 59. Sprocket wheel 60 is integral with gear 57, both of which are loosely mounted on shaft 51. Sprocket wheel 60 drives sprocket wheel 61 through chain 62, which said sprocket wheel 61 is keyed to shaft 63 and drives the same. Shaft 63 is rotatably mounted in bearings 66 and 67. Sprocket wheels 68 and 69 are keyed to shaft 63, and drive pan carrying chains 70 and 71. These chains together with their sprocket wheels and mountings form an endless conveyer. At the opposite end of the machine, said chains are carried by sprocket wheels 72 and 73 which are keyed to shaft 74. Said shaft 74 is rotatably mounted in bearings 75 and 76. The wormwheel 77 is provided with lugs 78 and 79 which carry short shafts 80 and 81 forming mountings for the idler gears 58 and 59 herein described in manner similar to that described in connection with miter gears 34 and 35. Wormwheels 42 and 77 are driven by worms 82 and 83 respectively, as shown in Fig. (3). These wormwheels are mounted loosely upon shafts 32 and 51. The worms 82 and 83 are keyed to the shaft 84, which is rotatably mounted in bearings 85 and 86, which bearings are secured to the framework of the machine in any suitable manner. Miter gear 87 is keyed to shaft 84, and meshes with miter gear 88 which is keyed to shaft 89. Shaft 89 is rotatably mounted in bearings 90 and 91 which bearings are secured to the frame of the machine in any suitable manner. Handwheel 92 is securely fastened to said shaft 89.

The operation of the machine is as follows:—

A sheet of dough is carried along on the apron 93 which is driven by power applied in any well known manner. The dough sheet is conveyed beneath the cutter which is actuated by the crankshaft 2. Power is applied to this crankshaft in any well known manner, and may come from the same source as that which drives the apron. The cutter cuts the dough sheet into crackers or biscuit forms, and these are conveyed along on the apron 93 to the point marked 94 where they fall off the apron onto pans beneath. These pans are placed upon the conveyer chains 70 and 71, between the dogs 95. As pans of this type are so well known in the art, it is though not necessary to show them herein.

In machines of this type it is found necessary to make adjustment in the mechanism which affects the panskip so as to have the panskip occur immediately after the last row of crackers has been deposited upon each pan, so that the next row of crackers may not fall between the pans, but on the other hand, may be properly laid upon the advance part of the succeeding pan. This adjustment is not uniform, but varies with different sizes of crackers and biscuits.

In the Allison & Pinkney patent, hereinbefore mentioned, the adjustment of the pans with the panskip is accomplished by accelerating or retarding the velocity of their panning chains above or below normal. In the herein invention the adjustment is not made by changing the velocity of the panning chains, but rather by accelerating or retarding the velocity of the pan skipping mechanism. This is brought about in the following manner:—Rotating a handwheel 92 in one direction communicates motion to wormwheels 42 and 77 through worms 82 and 83 and connecting mechanism. It is evident that rotating the wormwheel 42 in the proper direction will result in an acceleration of shaft 32, gears 44 and 45; and through gears 49 and 50 the panskip mechanism will be accelerated. Shaft 51 and gear 56 also receive acceleration, but since wormwheel 77 is also rotated simultaneously with wormwheel 42, the idler gears 58 and 59 are rolled about upon their driving gears 56 at the proper velocity and direction to completely offset the above mentioned acceleration of the gear 56, and consequently gear 57 and sprocket wheel 60 will rotate at their normal velocity. The wormwheel 42 and worm 82 and the wormwheel 77 and worm 83 are so constructed with proper leads, pitches and numbers of threads, as to compensate for the difference in velocities of the shafts 32 and 51. Also handwheel 92 may be rotated in the opposite direction to that heretofore mentioned, in which event the panskip mechanism will be retarded and will bring about a proper registration of the panskip with the pans.

I claim—

1. A pan carrier consisting of an endless conveyer, a pan skipping mechanism arranged to actuate said conveyer at certain intervals, power means for driving the endless conveyer at normal velocity, means supplementing the power means for transmitting hand power through the power means while the same is in motion for the purpose of setting the pan skip mechanism out of its normal position, together with means for maintaining the endless conveyer at normal velocity while said hand power means is being operated.

2. A pan carrier consisting of an endless conveyer, a pan skipping mechanism coöperating with said endless conveyer, power means for driving the endless conveyer at normal velocity, means for transmitting hand power through the power means while in motion for the purpose of accelerating or retarding the pan skipping mechanism, together with means for maintaining the endless conveyer at a constant speed while said hand power is being applied.

3. In a cracker cutting machine the combination with a continuously movable pan carrier of driving means therefor including a series of different sized gears, a shaft for said gears, pan skip gears coöperating with said driving means to periodically accelerate said carrier and manually actuated means for advancing the pan skip gears and for maintaining the pan carrier at normal velocity.

4. A pan carrier consisting of an endless conveyer, a pan skipping mechanism coöperating with said conveyer, differential gear mechanisms through which the skipping mechanism and endless conveyer are driven, with means coöperating with the differential gears for accelerating or retarding the pan skip mechanism without affecting the velocity of the endless conveyer.

5. A pan carrier consisting of an endless conveyer, a pan skipping mechanism coöperating with said conveyer, a differential gear mechanism for effecting advancement or recession of the pan skipping mechanism, a second differential gear mechanism coöperating with the first for the purpose of maintaining normal velocity of the endless conveyer while said pan skipping mechanism is advancing or receding, for the purpose of registering the panskip with the pans.

6. A pan carrier consisting of an endless conveyer, a pan skipping mechanism for periodically accelerating said endless conveyer, a differential gear mechanism for accelerating or retarding the pan skipping mechanism, a second differential gear mechanism for the purpose of neutralizing the effect on the endless conveyer of the first differential gear mechanism and a shaft connecting the two mechanisms to promote their synchronous action.

DANIEL K. ALLISON.

Witnesses:
C. H. Dunn,
Theo. L. Hoffman.